United States Patent [19]

Lambert et al.

[11] E Patent Number: Re. 32,111

[45] Reissued Date of Patent: Apr. 15, 1986

[54] COATED CEMENTED CARBIDE BODIES

[75] Inventors: John B. Lambert, Lake Forest, Ill.; Mortimer Schussler, Titusville, Fla.

[73] Assignee: Fansteel Inc., North Chicago, Ill.

[21] Appl. No.: 518,452

[22] Filed: Jul. 29, 1983

Related U.S. Patent Documents

Reissue of:

[64] Patent No.: 4,357,382
Issued: Nov. 2, 1982
Appl. No.: 204,475
Filed: Nov. 6, 1980

[51] Int. Cl.[4] ..... B32B 15/04; B32B 7/02

[52] U.S. Cl. ..... 428/212; 428/216; 428/220; 428/547; 428/698; 428/699

[58] Field of Search ..... 428/698, 699, 212, 216, 428/220, 457

[56] References Cited

U.S. PATENT DOCUMENTS

| | | | |
|---|---|---|---|
| 2,962,388 | 11/1960 | Ruppert et al. | 427/249 |
| 2,962,399 | 11/1960 | Ruppert et al. | 427/253 |
| 3,640,689 | 2/1972 | Glaski et al. | 428/472 |
| 3,736,107 | 5/1973 | Hale | 428/332 |
| 3,836,392 | 9/1974 | Lux et al. | 428/335 |
| 3,837,896 | 9/1974 | Lindstrom et al. | 428/336 |
| 3,977,061 | 8/1976 | Lindstrom et al. | 428/698 |
| 4,018,631 | 4/1977 | Hale | 428/698 |
| 4,035,541 | 7/1977 | Smith et al. | 428/699 |
| 4,101,703 | 7/1978 | Schintlmeister | 428/698 |
| 4,162,338 | 7/1979 | Schintlmeister | 427/249 |
| 4,180,400 | 12/1979 | Smith et al. | 428/469 |
| 4,237,184 | 12/1980 | Gonseth et al. | 428/698 |
| 4,284,687 | 8/1981 | Dreyer et al. | 428/336 |
| 4,399,168 | 8/1983 | Kullander | 428/698 |

FOREIGN PATENT DOCUMENTS

| | | | |
|---|---|---|---|
| 53-116285 | 10/1978 | Japan | 428/698 |
| 54-28316 | 3/1979 | Japan . | |
| 1389140 | 4/1975 | United Kingdom . | |

OTHER PUBLICATIONS

"Structure and Wear of Coated Cemented Carbides: TiC, TiN, and $Al_2O_3$", Gates et al., Report of Fansteel V/R Wesson, 800 Market St., Waukegan, Il. 60085; Presented at International Conference on Trends in Conventional and Non-Traditional Machining, Jun. 6, 1981, Sponsored by Illinois Institute of Technology.

*Primary Examiner*—John E. Kittle
*Attorney, Agent, or Firm*—Barnes, Kisselle, Raisch, Choate, Whittemore & Hulbert

[57] ABSTRACT

A process for increasing the resistance to wear of the surface of hard metal parts subject to wear, such as a cutting blade of metal cutting tools, and the product which results from the process, which includes coating the surface of the hard metal, for example, cemented carbide articles with a first layer comprised of one or more layers of a metallic carbide or nitride in a total thickness ranging from 0.01 to 10 μm, a second layer comprised of one or more layers of a refractory oxide, such as an oxide of aluminum, zirconium, silicon, calcium, magnesium, titanium, and hafnium, and stabilized zirconium oxide in a total thickness ranging from 0.5 to 10 μm, and depositing over the refractory oxide coating a third layer comprised of one or more layers of a nitride, carbonitride, oxynitride, oxycarbide or oxycarbonitride [and boride] of such metals as titanium, zirconium, hafnium, aluminum and silicon in a total thickness ranging from 1 to 10 μm. The process may include transitional layers to optimize the adherence of the various layers.

39 Claims, 13 Drawing Figures

COATED CEMENTED CARBIDE BODIES

Matter enclosed in heavy brackets [ ] appears in the original patent but forms no part of this reissue specification; matter printed in italics indicates the additions made by reissue.

FIELD OF INVENTION

The process of coating a cemented carbide substrate such as tungsten carbide with multiple coatings to increase the abrasive wear and crater resistance.

BACKGROUND AND OBJECTS OF THE INVENTION

Cemented carbide is used for many metal cutting applications at the present time. It is usually a sintered product resulting from a mixture of powdered tungsten carbide and a binder metal, usually cobalt. The addition of titanium carbide, hafnium carbide, and tantalum carbide or niobium carbide, or other metal carbides, in small percentages improves the resistance of cemented carbide to cratering but may cause a decrease in tool strength. Improved abrasive wear resistance and also resistance to cratering without a decrease in tool strength has been sought through the expedient of applying a thin coating on the surface of the cemented carbide. This makes it possible to achieve maximum resistance to abrasive wear and cratering while the substrate has suitable resistance to breakage and deformation. One of the first coatings utilized was titanium carbide which not only improved the tool life considerably but also permitted a substantial increase in cutting speeds. Another coating to achieve commercial recognition has been a so-called ceramic coating in the form of an oxide, such as aluminum oxide, $Al_2O_3$.

Chemical vapor deposition of the metal carbides on cemented tungsten carbide substrates has been the subject of investigation and use in the last two decades as evidenced by U.S. patents issued in 1960 to Ruppert, U.S. Pat. No. 2,962,388 and 2,962,399, and also a U.S. patent to Glaski, U.S. Pat. No. 3,640,689, issued Feb. 8, 1972. Thin coatings of nitrides, silicides, and carbides of the metals in Groups IVB, or VB and VIB of the Periodic Table have been applied to cemented carbide substrates for improving the wear characteristics of cutting inserts.

A further development, as indicated above, has been the addition of a surface layer of a refractory oxide such as $Al_2O_3$ or zirconium oxide as described in U.S. patents to Hale, U.S. Pat. No. 3,736,107, Lux, U.S. Pat. No. 3,836,392 and Lindstrom, U.S. Pat. No. 3,837,896.

While these layers, when added to the hard substrate, have improved the wear characteristics of cutting inserts, there have been continuing problems with respect to abrasive wear of the edge or flank of the metal cutting cemented carbide tools as well as cratering of the rake face of the tools.

It is accordingly an object of the present invention to provide a coated carbide insert which has an improved resistance to abrasion at the edge or flank of the insert while also achieving an improved resistance to cratering on the rake face of the tool.

It is a further object to provide a coated insert which has greater lubricity, a less reactive surface with materials being machined, a high hardness, and a better thermal barrier to protect the substrate.

An additional object of the invention is the provision of a process for producing an adherant, dense multilayer coating of the desired different compositions in each layer on the cemented carbide substrate.

Briefly, it has been discovered that the application of a coating of metallic nitrides or carbides, especially nitrides and carbonitrides, on the refractory oxides gives improved performance over the refractory oxides despite the fact the substances themselves on a substrate do not produce such superior results.

Other objects and features of the invention will be found in the following description and claims in which the invention is described together with details directed to those skilled in the pertinent arts of the manner and process of making and using the invention, all in connection with the best mode presently contemplated for the practice of the invention.

BRIEF DESCRIPTION OF THE DRAWINGS

DRAWINGS accompany the disclosure and may be briefly described as.

Figure 12:
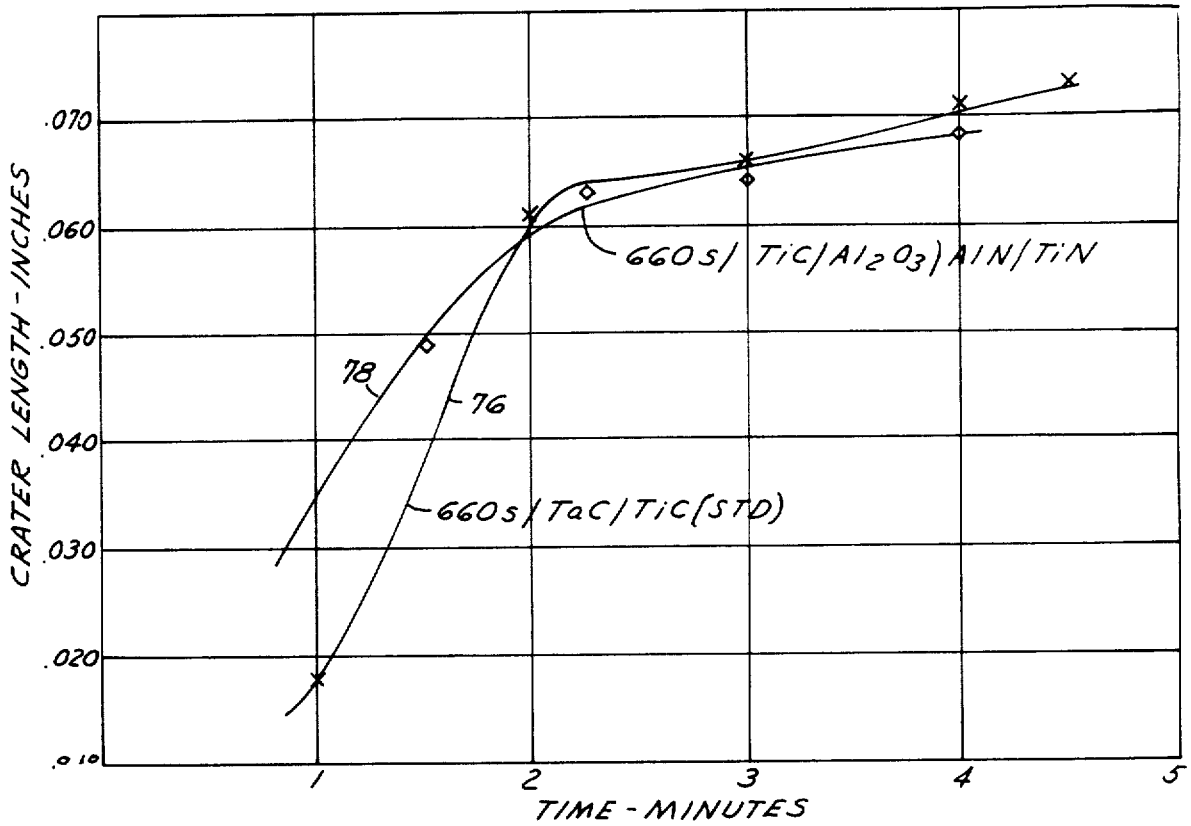
FIG. 12, a crater length versus time graph for the inserts of Example IV.

DETAILED DESCRIPTION OF THE INVENTION AND THE MANNER AND PROCESS OF MAKING AND USING IT

The process according to the invention comprises applying a multilayer coating composed of a different, specific hard metal compound composition in each layer with appropriate intermediate transition layers, preferably by chemical vapor deposition or possibly by metal sputtering. The total overall coating thickness is preferably from 1 to 30 $\mu$m. Essentially any cemented carbide can be used as the substrate. However, for use in machining materials such as steels and cast irons, the preferred substrate has been found to be a cemented carbide bonded with an iron-group metal, especially cobalt or cobalt plus nickel, and containing major amounts of tungsten carbide and smaller amounts of titanium carbide, hafnium carbide and tantalum carbide or niobium carbide, or both. Small amounts of carbide of the other Group IVB metal (i.e. zirconium), Group VB metal (i.e. vanadium), and Group VIB metals (i.e. chromium and molybdenum) may also be used in the cemented carbide. The coated product, when used for cutting steel at 500–1200 sfm, and, for example, at about 700 sfm, can have either resistance to flank wear or to cratering improved over prior art coated cemented carbides, and, with some embodiments, both of these desired characteristics are simultaneously improved.

The coatings of this invention have at least three layers of distinctly different hard metal compound species and usually there are four or five layers present because of transition layers which are deposited either incidentally or intentionally during the coating process.

It will be appreciated that the various layers can be applied by gas phase deposition referred to as chemical vapor deposition (CVD) process is as described in issued patents. This is sometimes also referred to as "gas plating" or "vapor plating". Examples are found in the disclosures of the following United States patents which are included herein by reference:

U.S. Pat. No. 3,640,689: Feb 8, 1972: Glaski

U.S. Pat. No. 3,837,896: Sept. 24, 1974: Lindstrom

U.S. Pat. No. 4,101,703: July 18, 1978: Schintlmeister

U.S. Pat. No. 4,162,338: July 24, 1979: Schintlmeister

A simple example of the gas vapor deposition includes the use of a mixture of methane and hydrogen gases along with a metallic halide gas such as, for example, titanium tetrachloride gas for depositing titanium carbide. The gas mixture is passed into a chamber in which the cemented carbide bodies to be coated are suitably supported. The temperatures may range from 900° C. to 1200° C., as a general rule, and should be below the melting point of the binder metal of the substrate. The chemical reaction is:

$$CH_4 + TiCl_4 \rightarrow 4HCl + TiC$$

The substrate in every case must be of good quality to provide the necessary strength and resistance to shock and the temperatures resulting from high speed cutting.

According to the present invention, the applied coatings, in combination with the substrate, provide a composite structure which not only improves the surface characteristics relative to abrasive wear and resistance to cratering but also does not significantly degrade the desirable strength and shock resistance qualities of the substrate. The resulting composite structure provides metal cutting inserts with an excellent combination of desired characteristics.

It is also important in the coated composite article to achieve a high degree of compatibility between the substrate and the layers to be applied to it, since the adhesion must be such as to withstand separation under heavy loads and impacts, particularly in interrupted cuts, as well as to withstand the thermal stresses developed during the cutting operation.

In the practice of the present invention, there is first, optionally, but preferably, a nucleating or transition layer applied on the substrate. This layer has a thickness of preferably 0.01 to 10 μm and can be comprised of a carbide, nitride, or carbonitride of Group IVB metals including titanium, zirconium and hafnium, and of Group VB metals including vanadium, niobium and tantalum, and a carbide of Group VIB metals including chromium, molybdenum and tungsten, or a combination of these. This layer can also be a composite layer comprised of layers of two or more of the above species. As an example, the first layer may be comprised of a barrier layer of a metal such as tantalum, or a nitride such as titanium nitride, and then another layer of titanium carbide, as taught by Glaski U.S. Pat. No. 3,640,689 previously incorporated by reference. This layer is intended to provide a more compatible crystal structure for the deposit of the next layer and to improve adherence between layers. This nucleating layer can also contain a smaller amount of binder metal (e.g., cobalt or other iron group metal including iron and nickel) from the substrate, if desired, by a diffusion heat treatment in a non-reactive atmosphere at 1300° C. to 1500° C. for 5 to 10 minutes subsequent to applying the first layer. This is described as an intermediate step in a Hale, U.S. Pat. No. 4,018,631, issued Apr. 19, 1977.

The second layer to be applied preferentially by the gas phase deposition method is a refractory oxide layer of 0.5 to 10 μm thickness. The refractory oxide should be thermodynamically stable, and preferably should have a standard free energy of formation at 1000° C. of less than −80 Kilocalories per gram-atom of oxygen in the oxide (i.e. more negative than −80 Kcal per gram-atom). Oxides of aluminum, zirconium, silicon, calcium, magnesium, titanium and hafnium, and stabilized zirconium oxide, or a combination of these, may be utilized. These oxide species generally follow the teachings of Lindstrom U.S. Pat. No. 3,977,061, in which similar refractory oxides were applied to a ceramic oxide substrate, which patent is incorporated herein by reference. The preferred material is aluminum oxide, $Al_2O_3$. The aluminum oxide may be modified by a dopant of tetravalent ions of titanium, zirconium or hafnium as taught by Smith U.S. Pat. No. 4,180,400, which is incorporated herein by reference. The second layer can also be a composite layer comprised of two or more layers of these oxides in combination.

An overcoat layer, according to the present invention is deposited over the oxide layer. This overcoat layer can be selected from nitrides, carbonitrides, oxynitrides, oxycarbides and oxycarbonitrides of titanium, zirconium, and hafnium (Group IVB of the Periodic Talble of Elements). Some compounds of aluminum and silicon, such as nitrides and oxynitrides, can be utilized in the overcoat layer. The specific overcoat layer is chosen to optimize the particular desired characteristics of abrasion resistancce or cratering resistance or to achieve improvements in both. The thickness of the overcoat layer may range from 0.5 to 10 microns, but the preferred thickness will depend on the material selected for the overcoat and the characteristics to be optimized as will be disclosed in connection with the examples to be presented.

In some cases to enhance the adhesion between the first and second layers, it may be desirable to provide a transition layer achieved by heating the article with the first layer in an oxidizing atmosphere to oxidize the first coating layer before applying the second oxide layer, according to the teachings of the Hale, U.S. Pat. No. 4,018,631.

The overcoat layer itself may be comprised of more than one of the above species such as an aluminum nitride layer applied to the second layer of $Al_2O_3$ and then a titanium nitride layer applied over the aluminum nitride layer. Other combinations with varying thicknesses and selection of species could be used to enhance certain characteristics.

In gas phase deposition when the same apparatus is utilized in a continuous process, that is, without purging the apparatus with an inert gas prior to the application of the subsequent layer, a gradual transition layer develops between the intended layers which improves the bond between the layers. For example, when a first layer of titanium carbide is applied followed by $Al_2O_3$, the transition layer may include titanium oxycarbide and titanium oxide and the aluminum oxide mixed with these titanium species.

In connection with this gas vapor deposition process, the flows of methane and titanium tetrachloride are cut off and the flows of aluminum chloride and carbon dioxide are commenced. This results in a mixture of gases in the deposition chamber and produces the products of transition mentioned above. In the preferred embodiments of this invention, it is desirable to have this transition take place to improve the adherence of the first and second layers and thus the resistance to spalling, flaking and separation.

Similarly, when shifting from the $Al_2O_3$ second layer to the nitride or other overcoat layer, the intermediate or transition layer may include a number of species related to aluminum and to the metal cation of the overcoat layer.

As a further example, when the overcoat layer is to be titanium nitride, the transition layer could include aluminum oxide, aluminum oxynitride, aluminum nitride, titanium carbide, titanium oxide, titanium oxynitride, titanium oxycarbide, titanium oxycarbonitride and titanium nitride in various mixtures which phase from aluminum and oxygen rich at the start of the transition to titanium and nitrogen rich at the end of the transition.

When other final layers are to be deposited, similar transition compounds will occur varying, of course, with the nature of the overcoat layer. When the overcoat layer is to be titanium carbonitride, all of the above transition products can occur with the exception of pure titanium nitride.

In general, it is desirable that the total thickness of the three coatings and any transition layers not exceed 20 μm to assure best performance of the coated tools.

Before proceeding with specific examples of the layers applied to a substrate, it will be appropriate to set forth the various problems relative to tool wear.

A cutting tool can fail by means of one or more of several wear processes. First, a gradual wear occurs at the tool flank which is called "flank wear" or "abrasive wear"; or, second, a gradual wear called "cratering" can occur at the tool rake face. In addition, mechanical breakage is a problem, and any coating layers that are applied must minimize any degradation effect on the strength of the substrate.

The abrasive wear results from the hard constituents of the workpiece material, including fragments of the built-up edge, plowing into the tool surface as they sweep over the tool. This is the primary cause of the so-called flank wear.

In connection with cratering of the rake face of the tool, when two surfaces are brought into intermittent contact under load and moved relative to each other, adhesion may occur at the high temperatures generated by plastic deformation and friction. Wear is then caused by the fracture of the bond or weld that occurs between the tool and the chip from the workpiece.

Figure 1:
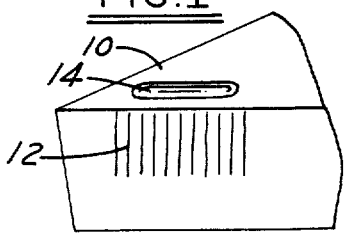
FIG. 1, a view of a cutting insert illustrating flank wear and cratering.

With reference to FIG. 1, the corner of an insert 10 is shown and the flank wear is illustrated at 12. The so-called "cratering", which is illustrated at 14 in FIG. 1, is a depression on the rake face of the tool caused by the friction resulting from high temperature and pressures that create a tendency for the chip to weld to particles of the insert, these particles eventually being torn away by the relative motion between the chip and the insert.

It is accordingly an object of the invention to improve the resistance of the coated substrate to flank wear as above defined and also to cratering without significantly diminishing the resistance of the substrate to shock and deformation.

Specific examples of several embodiments of the invention are to follow. In this connection, as background, standard, commercially available titanium carbide coated inserts were used as a basis for comparison. These standard state-of-the-art inserts employ a cemented carbide substrate having tungsten carbide, some additional amounts of titanium carbide and tantalum carbide and a cobalt binder. The titanium carbide coating on this substrate incorporates a thin tantalum carbide intermediate layer. The thickness of the coatings on the substrate is approximately 6 micrometers (μm) total thickness, of which the tantalum carbide intermediate layer is about 1 μm thickness and the titanium carbide outer layer comprises the remainder. The thickness dimensions of the coatings were determined by measurements made in metallographic examination of cross-sections taken through the coated inserts.

The style of cemented carbide inserts used was [American Standards Association Identification System (A.N.S.I.)] Type TNG, Size 333, with an 0.003" hone.

The standard titanium carbide coated inserts and the experimentally coated inserts, to be described, were evaluated for their machining performance by utilizing them in a single point toolholder with a 0° anvil, a 5° negative lead angle, and a 5° negative side rake. The material machined in lathe turning tests was AISI 4140 low alloy steel with a Brinell hardness of about 305. No coolant was employed. The steel was cut at 700 surface feet per minute (SFPM), feed of 0.011 inches per revolution (IPR), and depth of cut (DOC) of 0.075".

These test conditions can be considered as an accelerated life test designed to produce abrasive or flank wear and cratering on standard state-of-the-art tools essentially to the point of failure in a few minutes. In these tests, a record was made of the thermal cracking, chipping, abrasive wear, crater wear, flaking of the coating, tool forces, surface roughness and other observations at various time intervals during the cutting.

EXAMPLE I

Experimental coatings were applied to the same type of substrate as used in the commercially available titanium carbide coated inserts described above and which will be referred to as the standard control inserts.

One group of standard substrate inserts was cleaned by standard methods and heated in a hydrogen atmosphere to about 1060° C. Then a flow of titanium tetrachloride and methane was introduced to the hydrogen atmosphere, and the temperature maintained at about 1050° to 1075° C. for a sufficient time to achieved a CVD deposit of titanium carbide about 1 μm nominal thickness. Then the methane and titanium tetrachloride flows were stopped. The inserts were then subjected to a brief gaseous etch for about 7 minutes at 1020° C. in an atmosphere of chlorine with some hydrogen present to clean the inserts such as, for example, to remove any residue of free carbon that might be present. This procedure was generally employed after the application of the titanium carbide first layer on the experimentally coated inserts in this and subsequent Examples.

One group of such titanium carbide first layer coated inserts was further subjected at a temperature of about 1010° to 1030° C. to an atmosphere of aluminum trichloride, carbon dioxide and hydrogen for a sufficient time to deposit a second layer of aluminum oxide of about 6 μm nominal thickness. After completion of the deposition of aluminum oxide, the aluminum trichloride and carbon dioxide flows were stopped and the inserts were cooled under hydrogen. The actual coating thicknesses observed in metallographic cross-sections of these inserts showed a 1.0 μm thickness of titanium carbide and a 5.7 μm thickness of aluminum oxide.

An additional group of similar inserts having a titanium carbide first layer and an aluminum oxide second layer applied as described above was further coated in a continuous coating run by shutting off the flows of aluminum trichloride and carbon dioxide at the completion of the aluminum oxide deposition time, and then introducing flows of titanium tetrachloride and nitrogen along with hydrogen at a temperature of about 1010° to 1020° C. to provide a transition layer, as described earlier in the specification, between the aluminum oxide second layer and the overcoat of titanium nitride. This gas flow mixture was used to produce the overcoat layer of titanium nitride.

The specific thicknesses of the coating layers on these inserts as measured in metallographic cross-sections showed a titanium carbide coating thickness of 0.6 μm to 1.6 μm, aluminum oxide of 5.5 to 5.7 μm, a transition layer between the aluminum oxide and titanium nitride layers of 1.4 to 1.9 μm, and a titanium nitride outer layer of 4.5 to 7.5 μm.

Figure 2:
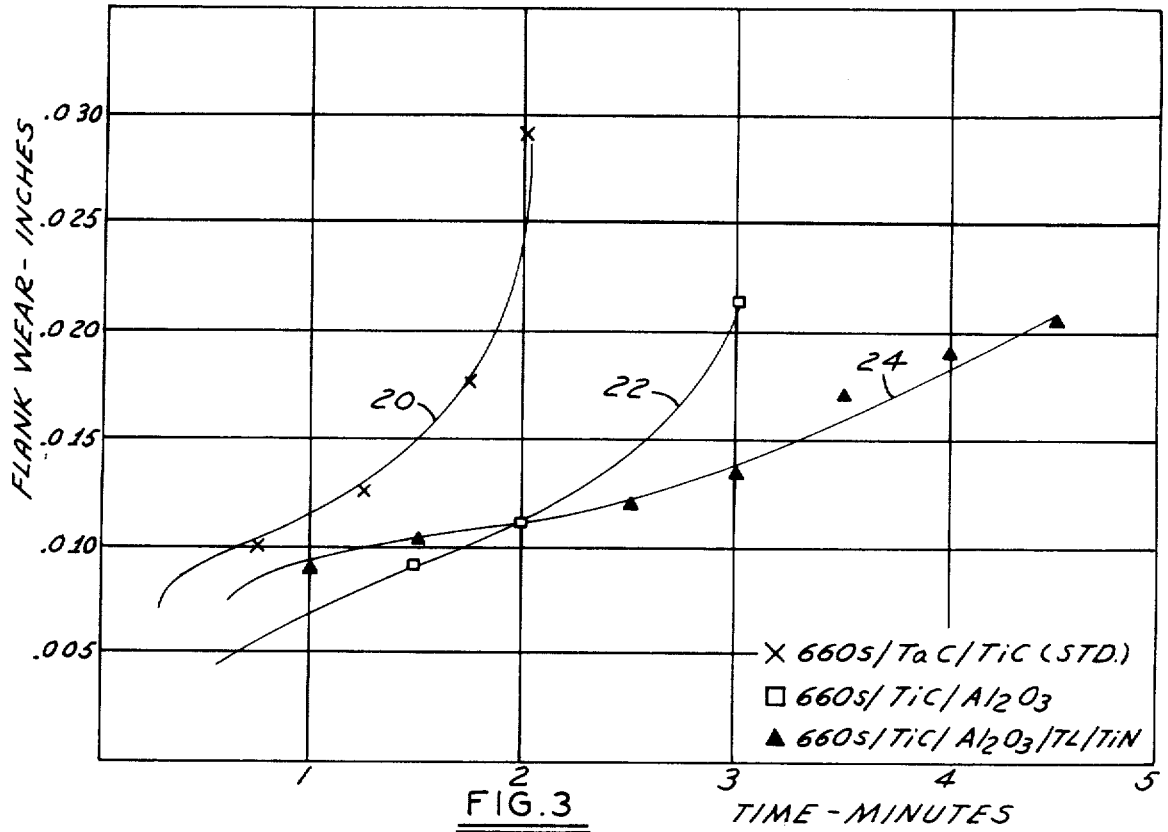
FIG. 2, a flank wear versus time graph showing comparative abrasive wear in connection with a specific example.
Figure 3:
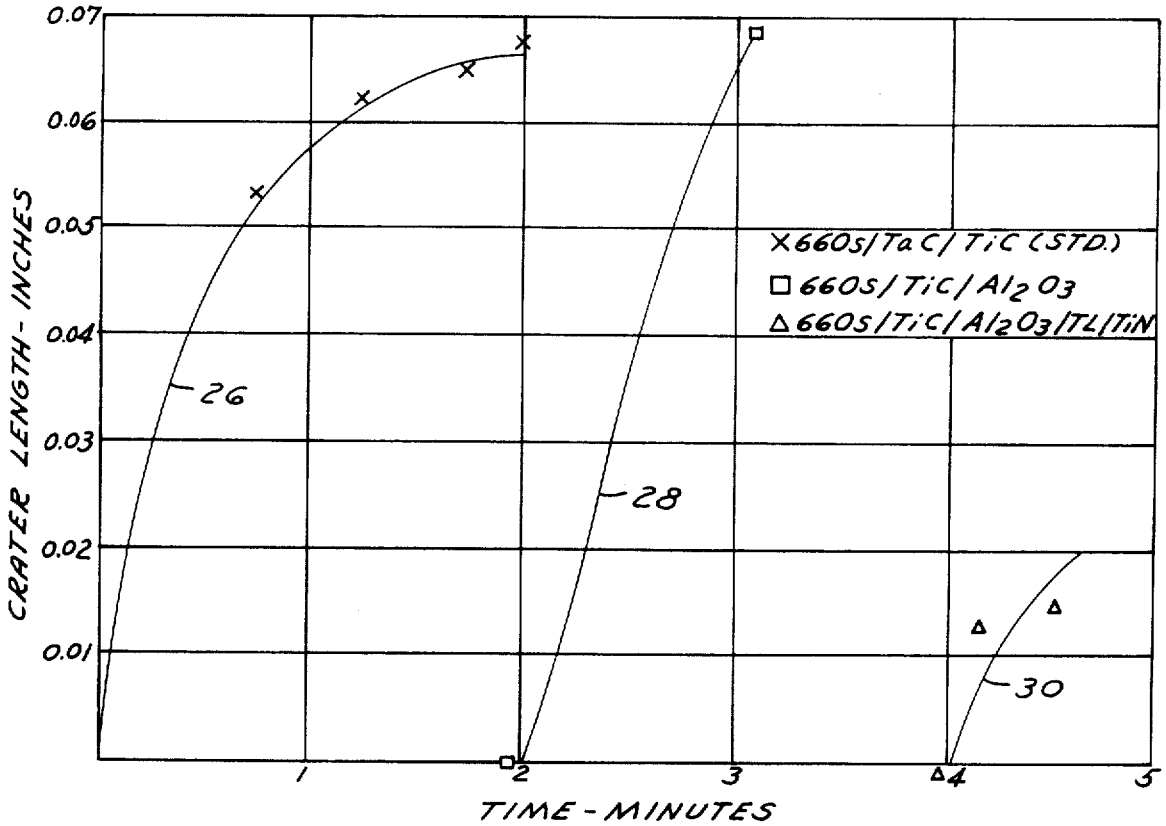
FIG. 3, a graph showing crater length versus time on a comparative basis.
Figure 4:
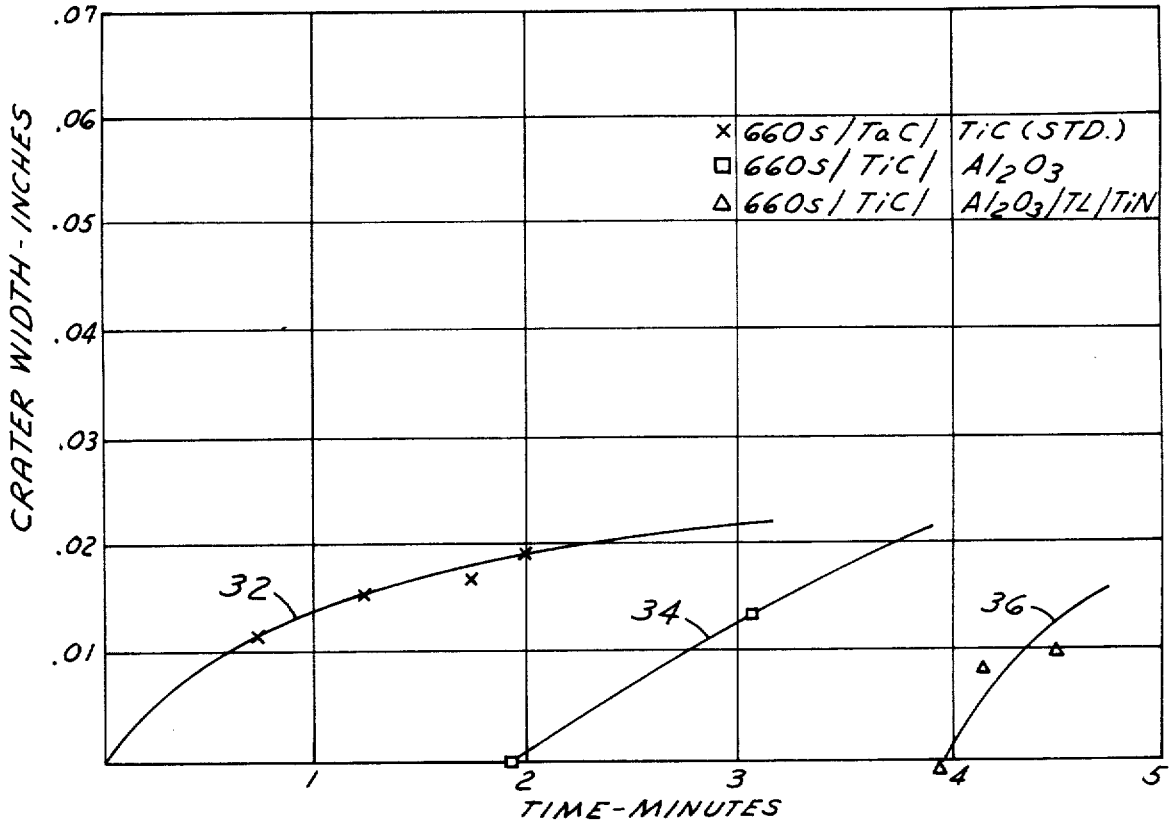
FIG. 4, a graph showing crater width versus time on a comparative basis.

In the graphs shown in FIGS. 2, 3 and 4, the test results are illustrated graphically. In FIG. 2, the curve 20 for the data points designated by X shows flank wear in inches versus time in minutes for the basis commercial comparative inserts having the titanium carbide coating. The second curve 22 with the open square data points illustrates the flank wear versus time for the inserts which had a first coating of titanium carbide plus a second coating of aluminum oxide ($Al_2O_3$). The third curve 24, delineated by the solid triangle data points, illustrating the flank wear versus time for the triple coated inserts containing the transition layer between the aluminum oxide second layer and the overcoat layer of titanium nitride.

It will be apparent that curve 22 shows superior results in abrasive wear resistance to the comparative curve 20, and curve 24 shows exceptionally superior results to either of the other coated inserts.

In FIG. 3, where crater length is plotted against time, similar curves with similar data point legends are illustrated respectively at 26, 28 and 30. Here again, the same comparative results pertain, with the triple coated inserts being far superior to the other two types of coated inserts.

In FIG. 4, there is a comparative showing of curves 32, 34 and 36 relative to crater width against time with the same legend for the data points as in the previous graphs. The inserts with the aluminum oxide coating illustrated at curve 34 are superior to the inserts with the standard titanium carbide shown in curve 32, and the inserts with the triple coating shown in curve 36 signify a much superior result in comparison with the other two types of coated inserts.

The test result from this Example illustrate graphically that both flank wear and cratering resistance are much superior when the substrate has the three coatings comprised of titanium carbide, followed by aluminum oxide, followed by a transitional layer, and ending in a titanium nitride overcoat layer.

EXAMPLE II

Titanium carbonitride was used as the overcoat in this example. The inserts had the same substrate and style as described in Example I, and had a titanium carbide first coat and aluminum oxide second coat applied with the same processing parameters.

In an experiment designated Run 2A, immediately following deposition of the aluminum oxide second coat, the flows of aluminum trichloride and carbon dioxide were cut off. The deposition chamber was purged for one-half hour with a small hydrogen flow while maintaining the temperature at about 1010° to 1030° C. Then flows of titanium tetrachloride, nitrogen and methane were introduced into the hydrogen atmosphere plus residual gases to provide, first, a transitional layer between the aluminum oxide second coat and the titanium carbonitride overcoat. The translational layer and the subsequent overcoat layer were applied at a temperature of 1000° to 1025° C. These inserts exhibited a coating thickness of about 5.3 μm for the titanium carbide first layer, 3.3 μm for the aluminum oxide second layer, and 4.5 to 4.7 μm for the titanium carbonitride overcoat layer, including the thin transitional layer which was barely visible in metallographic cross-sections of the coated inserts.

A second group of inserts designated Run 2B were similarly coated to provide a titanium carbonitride outer layer, except that the specific CVD process parameters were slightly varied as well as the position of the inserts on the tray in the coating chamber. The inserts from Run 2B exhibited a coating thickness of 3.3 to 4.7 μm in the titanium carbide first layer, 1.3 μm in the aluminum oxide second layer, and 2.0 μm in the titanium carbonitride outer layer including the thin, barely visible transitional layer in metallographic cross-sections of the coated inserts.

Regarding position of the inserts in the coating chamber, the inserts for Run 2A had been located near the edge of the coating tray, while, in Run 2B, they were located in the center of the tray near the gas inlet. This factor and the specific CVD process parameters resulted in the inserts from Run 2A being richer in nitrogen and exhibiting a brownish yellow color outer coating, while the coated inserts from the more carbonrich Run 2B exhibited a brownish purple color. Thus, two groups of inserts with a titanium carbonitride outer layer were produced but they had different carbon-to-nitrogen ratios in the titanium carbonitride overcoat layer.

Figure 5:
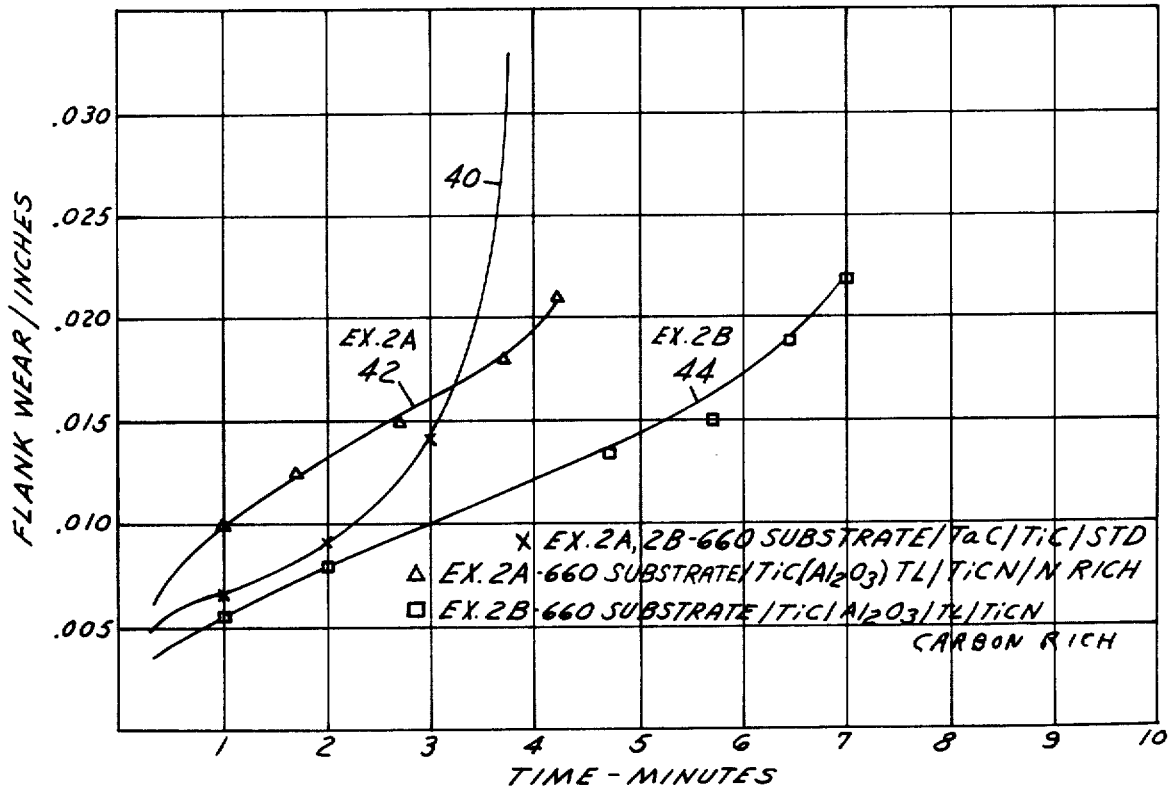
FIG. 5, a flank wear versus time graph for a second example having a titanium carbonitride overcoat on a comparative basis.
Figure 6:
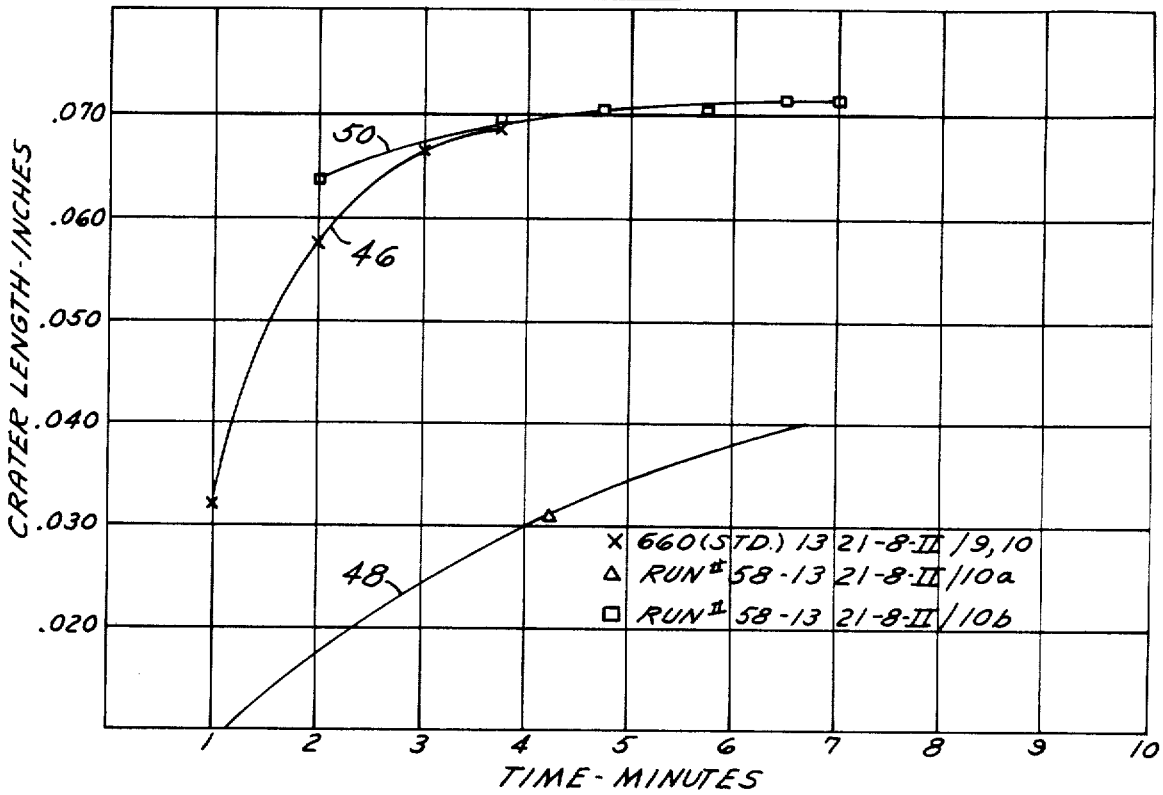
FIG. 6, a crater length versus time graph for a titanium carbonitride overcoat on a comparative basis.
Figure 7:
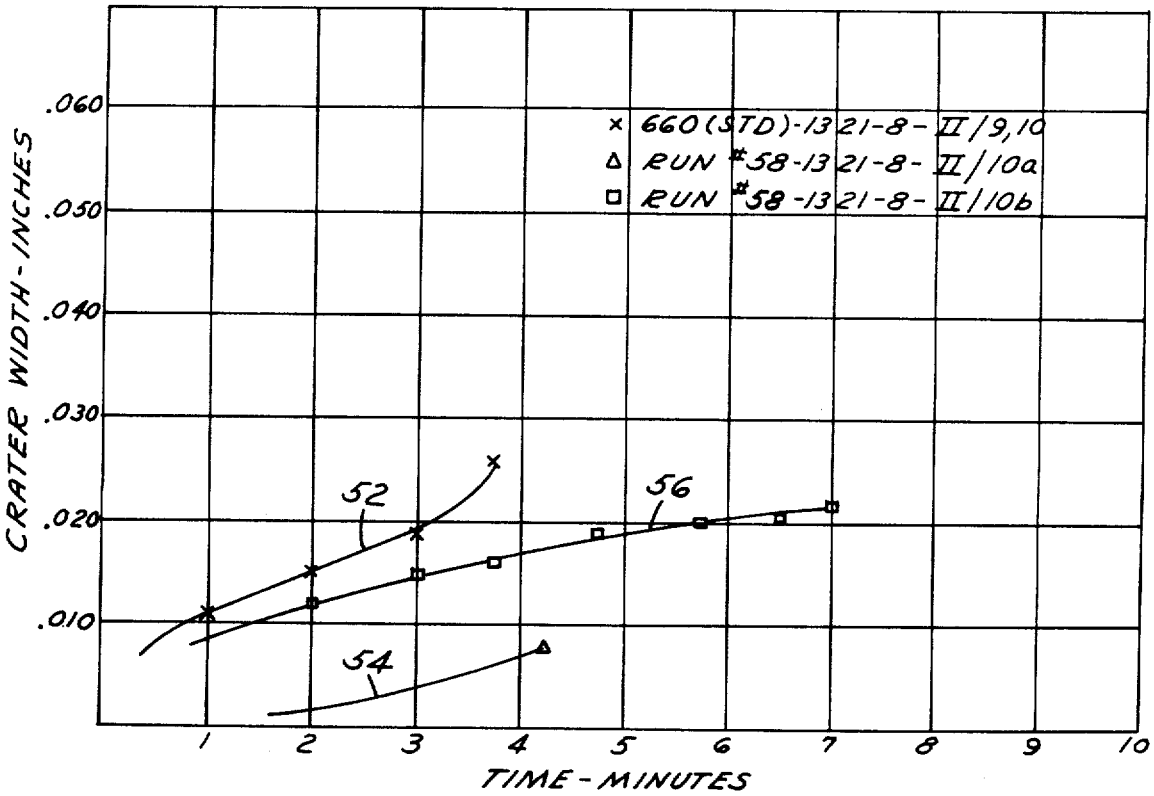
FIG. 7, a crater width versus time graph for a titanium carbonitride overcoat on a comparative basis.

Comparative results in connection with the previously described machining tests are found in the graphs of FIGS. 5, 6 and 7.

In FIG. 5, the curve 40 with the same legend as previously used shows the flank wear versus time for standard inserts previously described. The curve 42 shows the wear characteristics relative to flank wear for the inserts resulting from Run 2A. It will be noted that this curve 42 starts higher than the standdar curve 40 but crosses the curve 40 at a little above the 0.015" flank wear data point. The data for the inserts resulting from Run 2B are shown as curve 44, which indicates superior performance in comparison to both the standard control inserts and the inserts resulting from Run 2A.

In connection with crater length in the graph shown in FIG. 6, the curve 48 shows the wear characteristics of the standard inserts; curve 48 shows the crater wear length characteristics for the inserts resulting from Run 2A; and curve 50 shows such characteristics for the inserts resulting from Run 2B. In this case, it will be seen that, with respect to crater length, the Run 2A provides superior performance compared to the standard control inserts while Run 2B is similar to the standard.

In FIG. 7, the graph shows crater width versus time for the coated inserts. Relative to the crater wear width data for the standard inserts shown in curve 52, the results for inserts from Run 2A illustrated in curve 54 are definitely superior, while the data for the inserts from Run 2B illustrated in curve 56 lies between the standard curve and the curve 54, but displays superior results to the standard curve 52.

The results of the machining tests, therefore, in connection with Example II utilizing the overcoat of titanium carbonitride, show generally superior flank wear and crater resistance to the standard titanium carbide coated inserts.

Where maximizing of the abrasive wear resistance is desired, the titanium carbonitride outer layer should be higher in the carbon-to-nitrogen ratio in the titanium carbonitride overcoat layer than when the resistance to cratering is to be maximized. The CVD process parameters, as discussed above, and especially the specific flows of titanium tetrachloride, methane, nitrogen and hydrogen can be adjusted in the coating process relating to this invention to produce a desired carbon-to-nitrogen ratio in the titanium carbonitride overcoat in order to optimize the performance characteristics for a specific cutting application where such coated cutting tools are to be utilized.

A stratified titanium carbonitride overcoat layer of non-uniform composition can also be produced, if desired, for optimum performance. The types and general method of producing stratified coatings follow the teachings of Schintlmeister U.S. Pat. Nos. 4,101,703 and 4,162,338, which are incorporated herein by reference. For example, the carbon-to-nitrogen ratio in the carbonitride layer can be varied progressively through the thickness of the carbonitride layer. As a specific illustration, a titanium carbonitride having a high carbon content in the carbonitride can be deposited adjacent the second layer and then the carbon content can be progressively decreased and the nitrogen content progressively increased through the thickness of the third layer by progressively decreasing the flow of methane and increasing the flow of nitrogen in order to achieve the highest nitrogen content in the outermost stratum of the titanium carbonitride overcoat layer.

EXAMPLE III

In this example a different species of a cation is used in the hard metal compound of the overcoat layer. Cemented carbide inserts of the same type and style of substrate as used in Example I were given a first coat of titanium carbide and a second coat of aluminum oxide using essentially the same CVD process parameters as described in Example I. Then without interrupting the run, following the deposition of the aluminum oxide second coat the flow of carbon dioxide was stopped and a flow of nitrogen was initiated to deposit first a transition layer and then an overcoat layer of aluminum nitride at a temperature of about 1020° to 1025° C. Since some residual carbon dioxide was present in the CVD deposition chamber for at least the early portion of the aluminum nitride deposition, the transition layer is believed to contain aluminum oxynitride as one constituent of the transition layer. These inserts exhibited an overall total coating thickness for all layers of 8.7 to 14.0 μm. The thickness of the aluminum nitride overcoat layer, including the transition layer, was from 2.0 to 7.3 μm in thickness as observed in metallographic cross-sections of the coated inserts.

Metal cutting tests were performed under the same conditions as previously described with reference to FIGS. 2 to 7, to develop data for the inserts produced from Example III.

Figure 8:
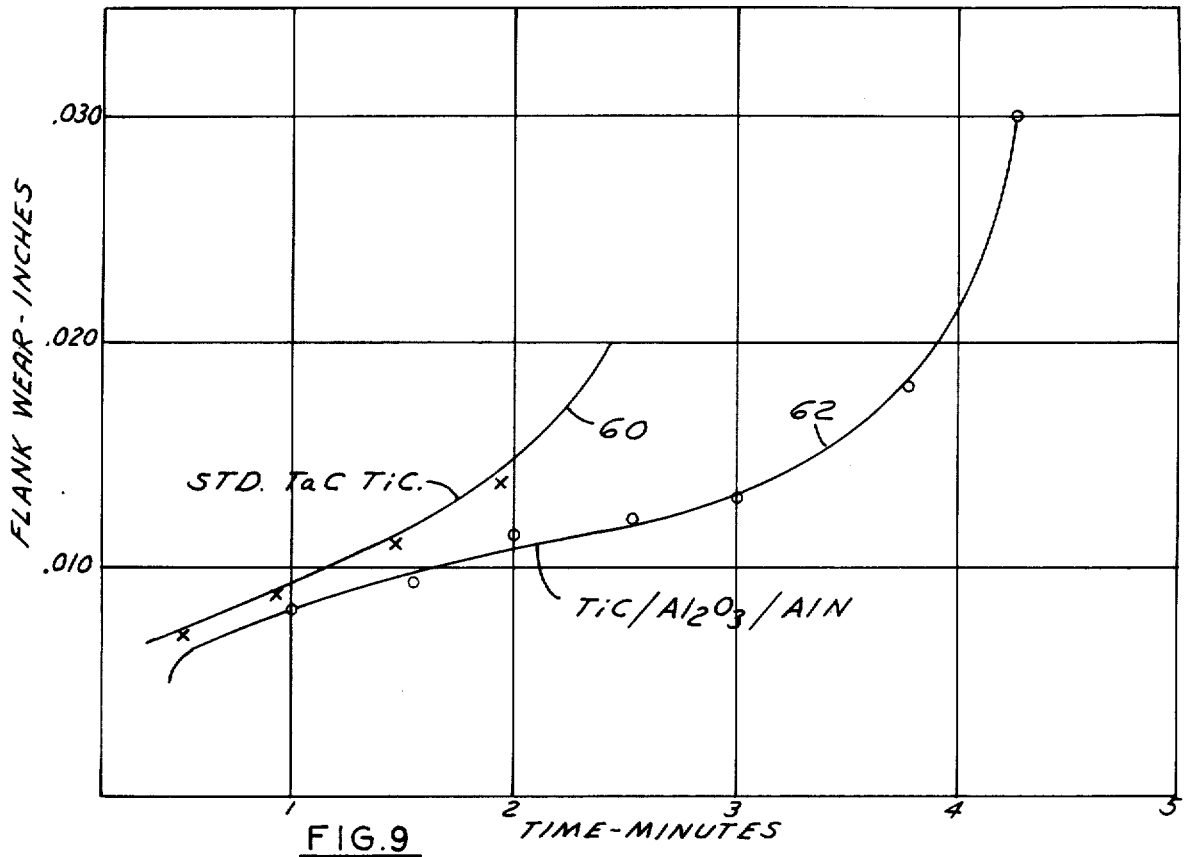
FIG. 8, a flank wear versus time graph for a third example having an aluminum nitride overcoat on a comparative basis.

In FIG. 8, the standard control inserts in the machining tests produced the data points exhibited in curve 60 showing flank wear as a function of cutting time. The data points resulting from the tests on the inserts having the overcoat of aluminum nitride are shown in curve 62. These curves show that the inserts with the aluminum nitride overcoat have superior abrasive wear characteristics.

Figure 9:
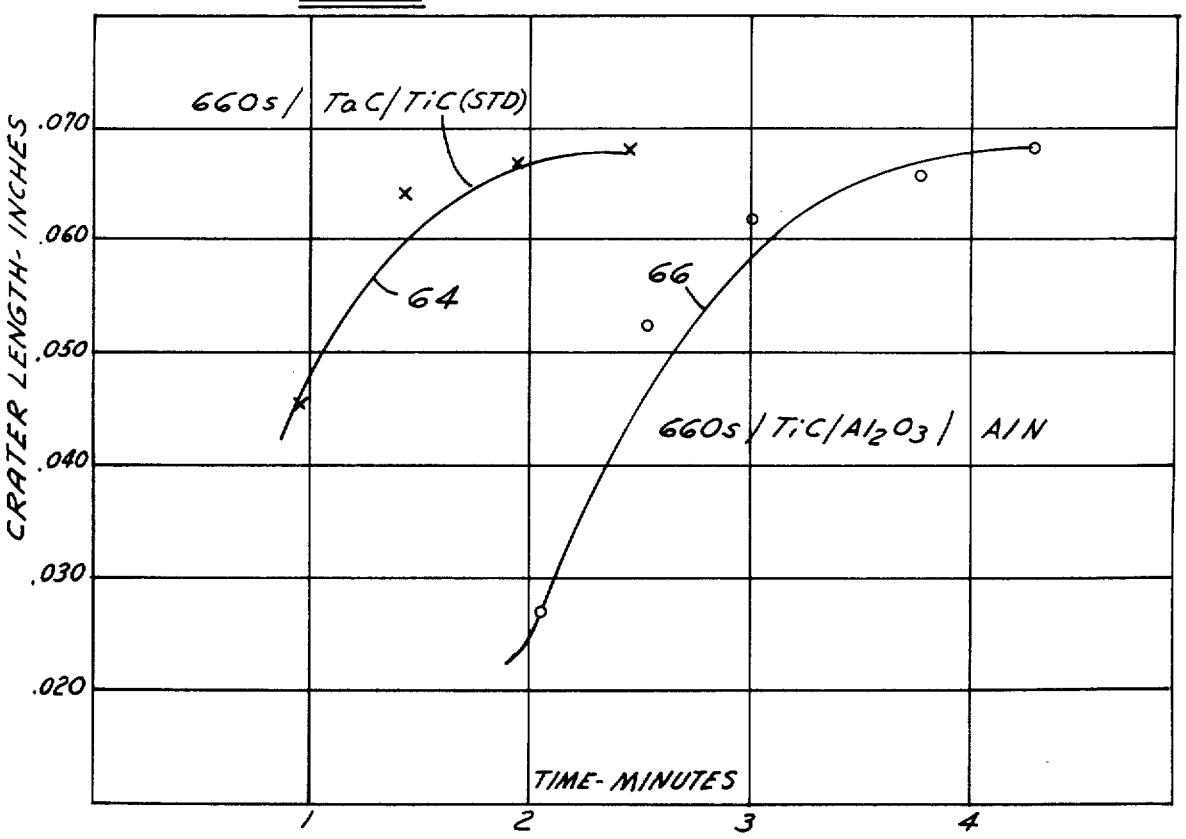
FIG. 9, a crater length versus time graph for the inserts resulting from Example III.

With respect to the crater length data developed from the machining tests using the coated inserts produced by Example III, FIG. 9 show the relative curves developed from the data points. The curve for the data points for the standard control inserts is shown at 64 while the curve for the data points for the inserts having the aluminum nitride overcoat is shown at 66. It is clear again, by comparison of the relative positions of curves 64 and 66, that the resistance to cratering as evidenced by the length of the crater was superior for the inserts having the aluminum nitride overcoat.

Figure 10:
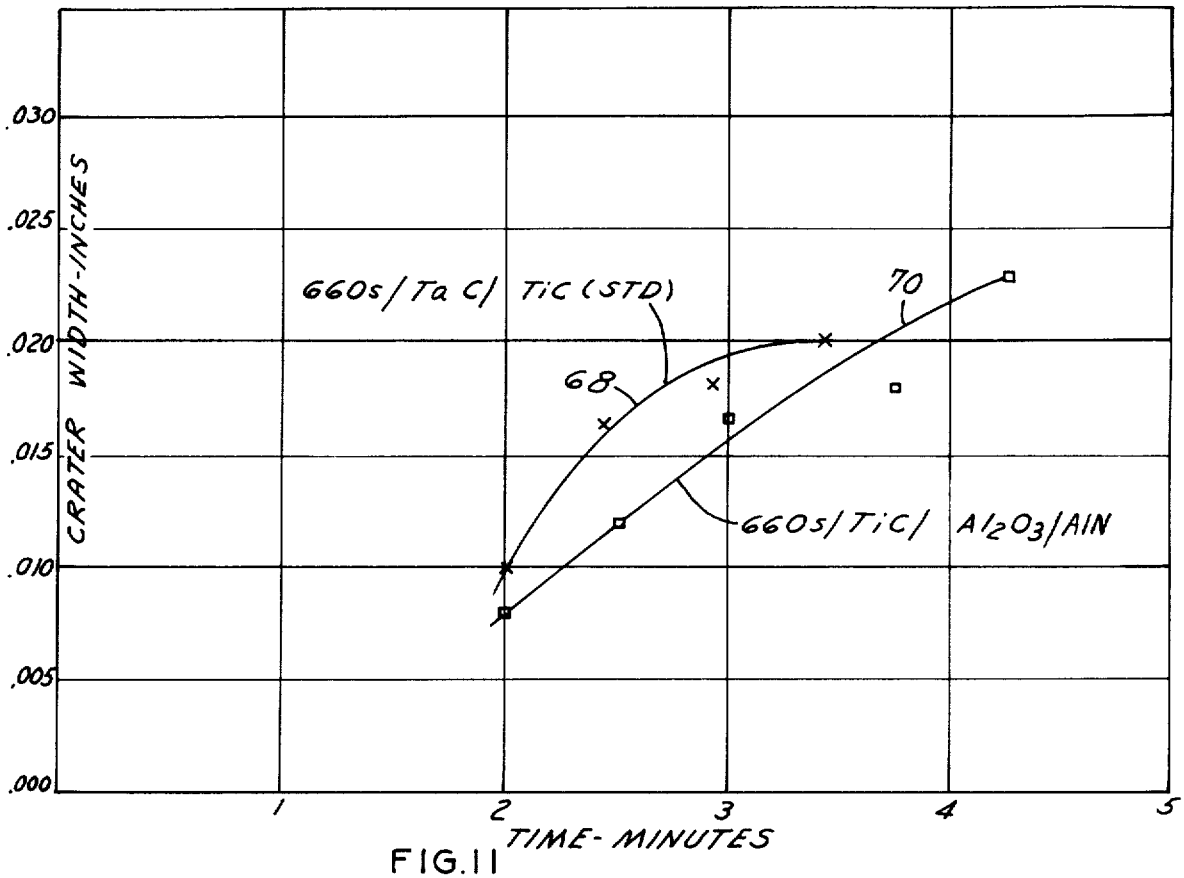
FIG. 10, a crater width versus time graph for the inserts resulting for Example III.

In FIG. 10, showing crater width results from the cutting tests, a curve 68 is developed from the data points for the standard control inserts. Curve 70 is developed from data points for the coated inserts of Example III with the aluminum nitride overcoat. With respect to crater width, the aluminum nitride overcoat also indicates improved performance compared to the control inserts.

Here again, in connection with the aluminum nitride overcoat, the machining results on inserts produced by Example III are in each case superior. With respect to crater width, the results are not as significantly superior as in connection with flank wear and crater length.

EXAMPLE IV

The previous examples have disclosed overcoat layers in which a single metal species was used in the metal compound. This present example covers an embodiment in which two different metal compounds are used in the overcoat layer.

The insert substrate and type was the same as used in Example I, and the inserts were given a first coat of titanium carbide and a second coat of aluminum oxide as described under Example I. After completion of the aluminum oxide second coat, and without interrupting the run, the flow of carbon dioxide was stopped and a flow of nitrogen was introduced to deposit a transition layer, and then an overcoat layer of aluminum nitride at a deposition temperature of about 1015° to 1030° C. Following this, the flow of aluminum trichloride was stopped and a flow of titanium, tetrachloride was introduced to deposit an additional transition layer and an outer overcoat layer of titanium nitride. These inserts from Example IV exhibited coating thicknesses of about 0.7 μm for the titanium carbide first coat, 3.3 μm for the aluminum oxide second coat, 1.3 μm for the aluminum nitride and associated transition layer, and 2.7 μm for the titanium nitride overcoat layer and associated transition layer in metallographic cross-sections of the coated inserts.

Figure 13:
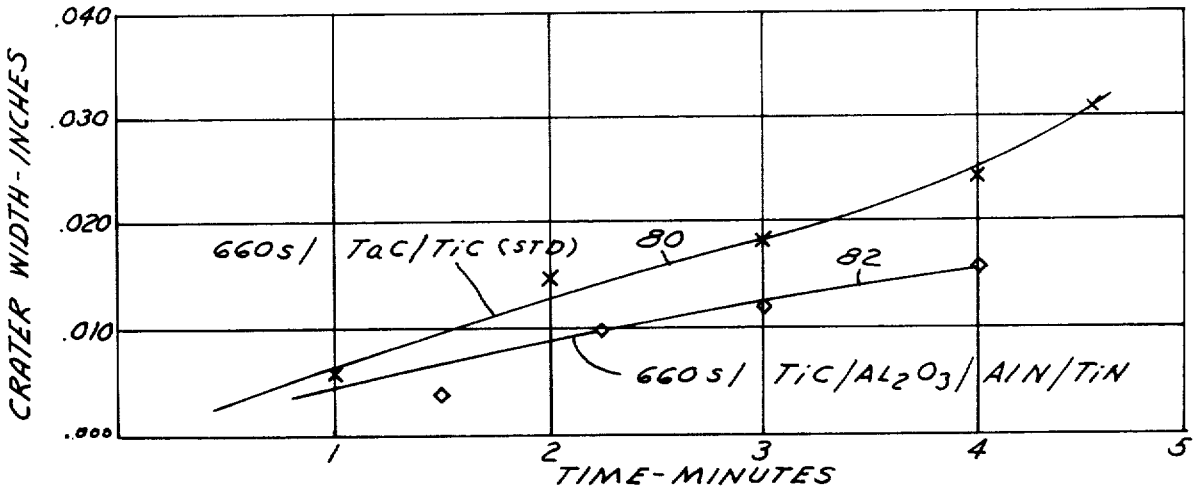
FIG. 13, a crater width versus time graph for the inserts of Example IV.
Figure 11:
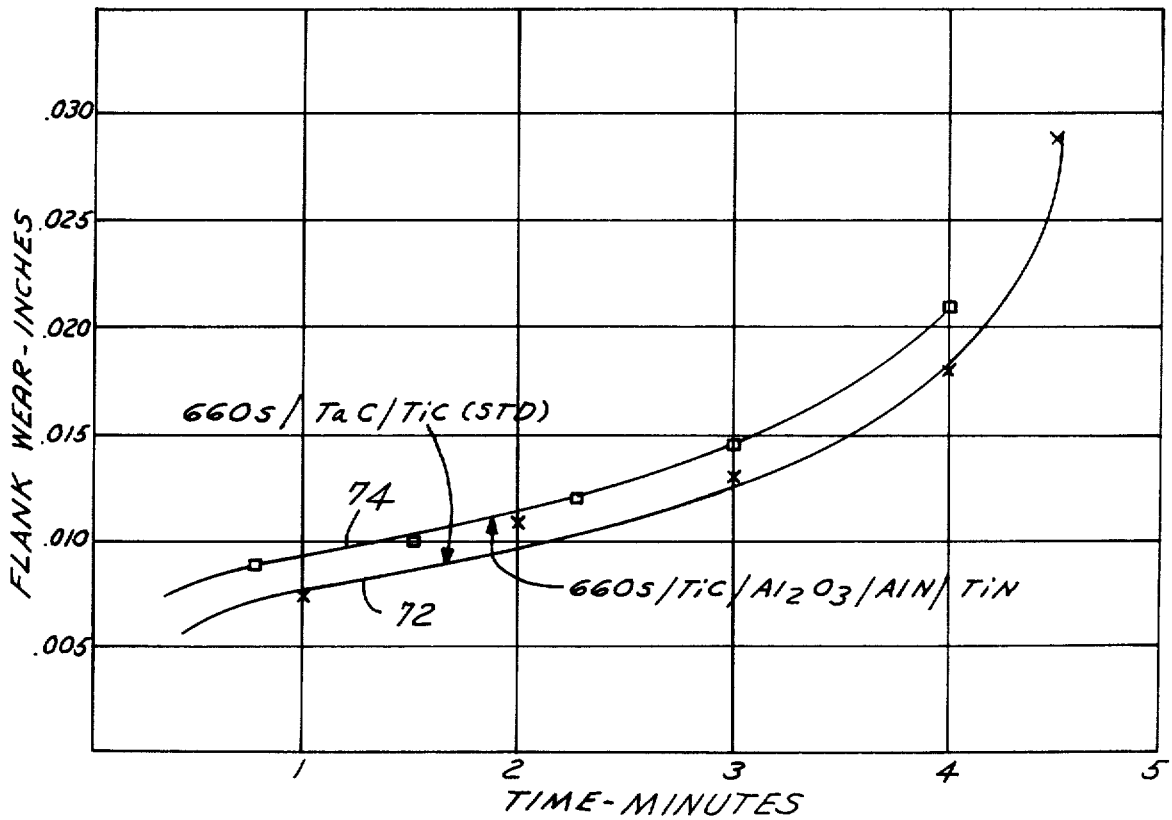
FIG. 11, a flank wear versus time graph for a fourth example having an aluminum nitride and titanium nitride overcoat.

In FIGS. 11, 12 and 13, the data control points resulting from the machining tests performed as previously described are shown, respectively, for flank wear, crater length, and crater width for the standard control inserts and for the coated inserts of this Example IV. In FIG. 11, curve 72 is developed from the data points on flank wear resulting from the machining tests on the standard control inserts. Curve 74 is developed from the data points on flank wear resulting from the machining tests on the coated inserts of Example IV which had an overcoat of aluminum nitride plus titanium nitride. It will be noticed that these curves parallel each other closely, with the standard control inserts having a somewhat better resistance to flank wear.

In FIG. 12, curves showing crater length versus machining time are illustrated for the data on the standard control inserts and for the coated inserts according to Example IV. The standard curve 76 rises sharply and levels off about 0.060" crater length. The curve 78 developed from the data points on the coated insert of Example IV starts at a higher initial rate of development of a crater but then closely parallel the control data curve 76 above 0.060 inch crater length.

In FIG. 13 relating to the crater width results, the curve 80 developed from the data points in machining tests using the standard control coated inserts is shown with comparison to curve 82 for the data points pertaining to the machining test using the coated inserts with the aluminum nitride and titanium nitride overcoat layers of this Example. These curves parallel each other, but the overcoated inserts show a lower crater wear width.

Although some preferred Examples for carrying out the process of the invention have been described herein in detail, it is to be understood that the invention is not limited to these precise Examples and embodiments and that numerous changes and modification may be made therein without departing from the scope of the invention.

What is claimed as new is as follows:

[1. A coated article for cutting tool and wear resistant applications which comprises a hard metal substrate and an abrasion and cratering resistant multiple layer coating on at least a portion of said substrate, said coating comprising:

(a) a first layer selected from a carbide, nitride or carbonitride of metals selected from Groups IVB and VB and a carbide of metals selected from Group VIB of the Periodic Table of Elements, (b) a second layer in the form of a refractory oxide selected from an oxide of aluminum, zirconium, silicon, calcium, magnesium, titanium, hafnium and stabilized zirconium oxide, and (c) a third and final layer of nitride compounds of metals selected from Group IVB of the Periodic Table and aluminum and silicon.]

[2. A coated article for cutting tool and wear resistant applications as defined in claim 1 in which a transition layer is formed between the second and third layers, the chemical composition of said transition layer varying from the composition of said second layer to the composition of said third layer.]

[3. A coated article for cutting tool and wear resistant applications as defined in claim 1 in which a transition layer is formed between said first and second layers by providing an oxide on said first layer before applying said second layer.]

[4. A coated article for cutting tool and wear resistant applications as defined in claim 1 in which an amount of binder metal selected from iron, nickel and cobalt is provided in first layer adjacent the said substrate.]

[5. A coated article for cutting tool and wear resistant applications as defined in claim 1 in which the overall thickness of said three layers on said substrate is in a range from 1 to 30 μm.]

[6. A coated article for cutting tool and wear resistant applications as defined in claim 1 in which said first layer has a thickness in the range of 0.01 to 10 μm.]

[7. A coated article for cutting tool and wear resistant applications as defined in claim 1 in which said second layer has a thickness in the range of 0.5 to 10 μm.]

[8. A coated article for cutting tool and wear resistant applications as defined in claim 1 in which said third layer has a thickness in the range of 0.5 to 10 μm.]

[9. A coated article for cutting tool and wear resistant applications as defined in claim 1 in which said first layer comprises a composite layer of two or more layers selected from a carbide, nitride and carbonitride of metals selected from Groups IVB and VB of the Periodic Table of Elements and a carbide of metals selected from Group VIB of the Periodic Table of Elements.]

[10. A coated article for cutting tool and wear resistant applications as defined in claim 1 in which said refractory oxide of said second layer comprises a composite layer of two or more layers selected from an oxide of aluminum, zirconium, silicon, calcium, magnesium, titanium and hafnium, and stabilized zirconium oxide.]

[11. A coated article for cutting tool and wear resistant applications as defined in claim 1 in which said third layer comprises a layer selected from a nitride, carbonitride, oxynitride, and oxycarbonitride of metals selected from Group IVB of the Periodic Table of Elements, and aluminum and silicon.]

[12. A coated article for cutting tool and wear resistant applications as defined in claim 1 in which said third and final layer comprises a composite layer of two or more layers selected from a nitride, carbonitride, oxynitride, and oxycarbonitride of metals selected from Group IVB of the Periodic Table of Elements, and aluminum and silicon.]

[13. A coated article for cutting tool and wear resistant applications as defined in claim 11 in which, in the selected carbonitride, the carbon-to-nitrogen ratio is controlled to provide a nitrogen-rich carbonitride.]

[14. A coated article for cutting tool and wear resistant applications as defined in claim 11 in which, in the selected carbonitride, the carbon-to-nitrogen ratio is controlled to provide a carbon-rich carbonitride.]

[15. A coated article for cutting tool and wear resistant applications as defined in claim 1 in which the third, and final layer comprises a composite coating on said second layer, said composite coating comprising a layer of selected metal carbide overlying the second layer, a layer of selected metal carbonitride overlying the metal carbide, and a layer of a selected metal nitride overlying the metal carbonitride.]

[16. A coated article for cutting tool and wear resistant applications as defined in claim c.o.c. 1 in which the third layer comprises a composite coating on said second layer, said composite coating including a layer of titanium carbide, a transition layer containing titanium carbonitrides overlying said layer of titanium carbide, and a layer of titanium nitride overlying said transition layer.]

[17. A coated article for cutting tool and wear resistant applications as defined in claim 1 in which said third and final layer deposited on said second refractory oxide comprises a composite coating in transition from basic depositions high in concentration of the chemical elements constituting the second layer and low in concentration of the chemical elements of the third layer and progressing to increasing concentration of the chemical elements of the third layer and decreasing chemical elements of the second layer.]

[18. A coated article for cutting tool and wear resistant applications as defined in claim 11 in which said carbonitride of said third layer has a carbon content which is highest adjacent said second layer and varies in the thickness of said third layer to progressively lower carbon content and higher nitrogen content until the composition of the outermost stratum of said third layer has the highest nitrogen content in said carbonitride layer.]

[19. A coated article for cutting tool and wear resistant applications as defined in claim 1 in which said third and final layer deposited on said layer of refractory oxide comprises a composite coating in transition from basic depositions high in oxygen content in the compounds deposited and low in nitrogen content in the compounds formed adjacent the second layer and progressively decreasing in oxygen content and increasing in nitrogen content into the third layer.]

[20. A coated article for cutting tool and wear resistant applications as defined in claim 19 in which the refractory oxide of said layer is aluminum oxide and said third layer progresses in chemical composition from aluminum oxide of the second layer to aluminum nitride.]

[21. A coated article for cutting tool and wear resistant applications as defined in claim 1 in which the third layer is a composite layer comprised of multiple layers selected from two or more nitride compounds of metals in Group IVB of the Periodic Table of Elements, and of aluminum and of silicon.]

[22. A coated article for cutting tool and wear resistant applications which comprises a substrate and a coating on at least a portion of said substrate, said coating comprising:

(a) a first layer selected from a carbide, nitride, and carbonitride of metals selected from Groups IVB and VB and of a carbide of metals selected from Group VIB of the Periodic Table of Elements, (b) a second layer selected from an oxide of aluminum, zirconium, silicon, calcium, magnesium, titanium, and hafnium, and stabilized zirconium oxide, and (c) a third and final layer selected from a nitride, carbonitride, oxynitride, and oxycarbonitride of metals selected from Group IVB of the Periodic Table of Elements, and of aluminum, and of silicon.]

[23. A coated article for cutting tool and wear resistant applications which comprises a substrate and a coating on at least a portion of said substrate, said coating comprising:

(a) a first layer comprising one or more layers selected from a carbide, nitride, and carbonitride of metals selected from Groups IVB and VB and of a carbide of metals selected from Group VIB of the Periodic Table of Elements, (b) a second layer comprising one or more layers selected from an oxide of aluminum, zirconium, silicon, calcium, magnesium, titanium, and hafnium, and stabilized zirconium oxide, and (c) a third and final layer comprising more than one layer selected from a nitride, carbonitride, oxynitride, and oxycarbonitride of metals selected from Group IVB of the Periodic Table of Elements, and of aluminum, and of silicon.]

*24. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement which comprises providing a transition layer between the second and third layers, the chemical composition of said transition layer varying from the composition of said second layer to the composition of said third layer.*

*25. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which said first layer comprises a composite layer of two or more layers selected from a carbide, nitride and carbonitride of metals selected from Groups IVB and VB of the Periodic Table of Elements, and a carbide of metals selected from Group VIB of the Periodic Table of Elements.*

*26. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB*

*and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which said third layer comprises a layer selected from a carbonitride, oxynitride and oxycarbonitride of metals selected from Group IVB of the Periodic Table of Elements, and a nitride and oxynitride of aluminum and silicon.*

*27. A coated article for cutting tool and wear resistant applications as defined in claim 26 in which, in a selected carbonitride, the carbon-to-nitrogen ratio is controlled to provide a nitrogen-rich carbonitride.*

*28. A coated article for cutting tool and wear resistant applications as defined in claim 26 in which, in a selected carbonitride, the carbon-to-nitrogen ratio is controlled to provide a carbon-rich carbonitride.*

*29. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which the third layer comprises a composite coating on said second layer, said composite coating comprising a layer of selected metal carbide overlying the second layer, a layer of selected metal carbonitride overlying the metal carbide, and a layer of a selected metal nitride overlying the metal carbonitride.*

*30. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which the third layer comprises a composite coating on said second layer, said composite coating including a layer of titanium carbide, a transition layer containing titanium carbonitrides overlying said layer of titanium carbide, and a layer of titanium nitride overlying said transition layer.*

*31. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which said third layer deposited on said second refractory oxide comprises a composite coating in transition from basic depositions high in concentration of the chemical elements constituting the second layer and low in concentration of the chemical elements of the third layer and progressing to increasing concentration of the chemical elements of the third layer and decreasing chemical elements of the second layer.*

*32. A coated article for cutting tool and wear resistant applications as defined in claim 26 in which a carbonitride of said third layer has a carbon content which is highest adjacent said second layer and varies in the thickness of said third layer to progressively lower carbon content and higher nitrogen content until the composition of the outermost stratum of said third layer has the highest nitrogen content in said carbonitride layer.*

*33. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

*(b) a second layer in the form of a refractory oxide selected from an oxide of aluminum, zirconium, silicon, calcium, magnesium, titanium and hafnium and stabilized zirconium oxide, and*

*(c) a third and final layer of nitride compounds of metals selected from Group IVB of the Periodic Table and aluminum and silicon, that improvement in which said third layer deposited on said layer of refractory oxide comprises a composite coating in transition from basic depositions high in oxygen content in the compound deposited and lower in nitrogen content in the compounds formed adjacent the second layer and progressively decreasing in oxygen content and increasing in nitrogen content into the third layer.*

*34. A coated article for cutting tool and wear resistant applications as defined in claim 33 in which the refractory oxide of said layer is aluminum oxide and said third layer progresses in chemical composition from aluminum oxide of the second layer to aluminum nitride.*

*35. A coated article for cutting tool and wear resistant applications which comprises a hard metal substrate and an abrasion and cratering resistant multiple layer coating on at least a portion of said substrate in which said coating includes:*

*(a) a first layer selected from a carbide, nitride or carbonitride of metals selected from Groups IVB and VB and a carbide of metals selected from Group VIB of the Periodic Table of Elements,*

(b) *a second layer in the form of a refractory oxide selected from an oxide of aluminum, zirconium, silicon, calcium, magnesium, titanium and hafnium and stabilized zirconium oxide, and*

(c) *a third and final layer of nitride compounds of metals selected from Group IVB of the Periodic Table and aluminum and silicon, that improvement which comprises a transition layer between the second and third layers selected from aluminum oxynitride, aluminum nitride, titanium carbide, titanium oxide, titanium oxycarbide, and titanium oxycarbonitride which phase from aluminum and oxygen rich at the initiation of the transition layer to titanium and nitrogen rich at the end of the transition.*

*36. A coated article for cutting tool and wear resistant applications which comprises a hard metal substrate and an abrasion and cratering resistant multiple layer coating on at least a portion of said substrate in which said coating includes:*

(a) *a first layer selected from a carbide, nitride or carbonitride of metals selected from Groups IVB and VB and a carbide of metals selected from Group VIB of the Periodic Table of Elements,*

(b) *a second layer in the form of a refractory oxide selected from an oxide of aluminum, zirconium, silicon, calcium, magnesium, titanium and hafnium and stabilized zirconium oxide, and*

(c) *a third and final layer of nitride compounds of metals selected from Group IVB of the Periodic Table and aluminum and silicon, that improvement in which the second coat is aluminum oxide followed by a transition layer including aluminum oxynitride, the overall thickness of the layers being 8.7 to 14 μm, the thickness of the aluminum nitride including the transition layer being 2.0 to 7.3 μm.*

*37. A coated article as defined in claims 24, 25, 26, 27, 28, 29, 30, 31, 32, 33, 34 or 35, in which the thickness of the second layer is 3 to 10 μm and the ratio of the thickness of the second layer to said first layer is greater than 0.5.*

*38. A coated article as defined in claims 24, 25, 26, 27 to 34 or 35 in which said second layer has a thickness of about 3.3 μm and said first layer has a thickness of about 5.3 μm.*

*39. A coated article as defined in claims 24, 25, 26, 27 to 34 or 35 in which said third layer has a thickness of 2 to 10 μm to completely cover surface roughness and provide a uniform and smooth surface.*

* * * * *